United States Patent
Lin et al.

(10) Patent No.: US 11,765,758 B2
(45) Date of Patent: Sep. 19, 2023

(54) RESOURCE CONFIGURATION METHOD AND APPARATUS, COMPUTER DEVICE AND STORAGE MEDIUM

(71) Applicant: GUANGDONG OPPO MOBILE TELECOMMUNICATIONS CORP., LTD., Dongguan (CN)

(72) Inventors: Yanan Lin, Dongguan (CN); Jing Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/192,898

(22) Filed: Mar. 5, 2021

(65) Prior Publication Data

US 2021/0195614 A1   Jun. 24, 2021

Related U.S. Application Data

(63) Continuation of application No. PCT/CN2019/086297, filed on May 9, 2019.

(51) Int. Cl.
*H04W 72/04* (2023.01)
*H04W 72/50* (2023.01)
(Continued)

(52) U.S. Cl.
CPC ..... *H04W 72/535* (2023.01); *H04W 72/0446* (2013.01); *H04W 72/1268* (2013.01); *H04W 72/21* (2023.01)

(58) Field of Classification Search
CPC ......... H04W 72/1257; H04W 72/0446; H04W 72/1268; H04W 72/1284
See application file for complete search history.

(56) References Cited

U.S. PATENT DOCUMENTS 9,247,536 B2   1/2016 Yang et al.
10,187,882 B2  1/2019 Kusashima et al.
(Continued)

FOREIGN PATENT DOCUMENTS

CN    101378306 A    3/2009
CN    101478371 A    7/2009
(Continued)

OTHER PUBLICATIONS

PCT Written Opinion of The International Searching Authority issued in corresponding International Application No. PCT/CN2019/086297, dated Feb. 12, 2020, 7 pages.
(Continued)

*Primary Examiner* — Khaled M Kassim
*Assistant Examiner* — Zhaohui Yang
(74) *Attorney, Agent, or Firm* — BAYES PLLC

(57) ABSTRACT

The present disclosure relates to a resource configuration method and apparatus, a computer device, and a storage medium. A terminal receives configuration information sent by a network device. Since the configuration information is used to indicate at least one PUCCH resource, and the at least one PUCCH resource is used to transmit feedback response information corresponding to a plurality of downlink semi-persistent scheduling resources, the terminal may send the feedback response information corresponding to the downlink semi-persistent scheduling resources on the PUCCH resource indicated by the configuration information, or a plurality of SPS resources may share one PUCCH resource, so that each downlink semi-persistent scheduling resource has a corresponding PUCCH resource that may transmit the feedback response information, thereby avoiding the circumstance in the prior art in which some downlink semi-persistent scheduling resources have no available PUCCH resources, and ensuring the quality of data transmission.

9 Claims, 2 Drawing Sheets

(51) Int. Cl.
*H04W 72/0446* (2023.01)
*H04W 72/1268* (2023.01)
*H04W 72/21* (2023.01)

(56) References Cited

U.S. PATENT DOCUMENTS

| | | | |
|---|---|---|---|
| 2015/0195072 A1* | 7/2015 | Seo | H04L 1/1614 370/329 |
| 2015/0257150 A1 | 9/2015 | Yi et al. | |
| 2017/0135116 A1* | 5/2017 | Kuchibhotla | H04L 43/087 |
| 2017/0208612 A1* | 7/2017 | Tushar | H04W 88/08 |
| 2017/0237546 A1 | 8/2017 | Yang et al. | |
| 2017/0290030 A1 | 10/2017 | Wang et al. | |
| 2019/0116006 A1* | 4/2019 | Lunttila | H04L 1/1861 |
| 2019/0356455 A1* | 11/2019 | Yang | H04W 72/0446 |
| 2020/0067574 A1* | 2/2020 | Yang | H04B 7/0417 |
| 2020/0196345 A1* | 6/2020 | Gupta | H04W 72/044 |
| 2021/0045112 A1* | 2/2021 | Yeo | H04L 5/0094 |

FOREIGN PATENT DOCUMENTS

| | | |
|---|---|---|
| CN | 101835271 A | 9/2010 |
| CN | 101932116 A | 12/2010 |
| CN | 102014505 A | 4/2011 |
| CN | 102045773 A | 5/2011 |
| CN | 102123016 A | 7/2011 |
| CN | 102158326 A | 8/2011 |
| CN | 102237989 A | 11/2011 |
| CN | 102264039 A | 11/2011 |
| CN | 102378387 A | 3/2012 |
| CN | 102523627 A | 6/2012 |
| CN | 102625999 A | 8/2012 |
| CN | 102752088 A | 10/2012 |
| CN | 103179672 A | 6/2013 |
| CN | 103327637 A | 9/2013 |
| CN | 103796315 A | 5/2014 |
| CN | 104247313 A | 12/2014 |
| CN | 104284425 A | 1/2015 |
| CN | 104812072 A | 7/2015 |
| CN | 104935415 A | 9/2015 |
| CN | 105099605 A | 11/2015 |
| CN | 105580289 A | 5/2016 |
| CN | 105763294 A | 7/2016 |
| CN | 106559188 A | 4/2017 |
| CN | 106658742 A | 5/2017 |
| CN | 107197520 A | 9/2017 |
| CN | 107294686 A | 10/2017 |
| CN | 107295664 A | 10/2017 |
| CN | 107295676 A | 10/2017 |
| CN | 107295685 A | 10/2017 |
| CN | 107295696 A | 10/2017 |
| CN | 107370589 A | 11/2017 |
| CN | 109474371 A | 3/2019 |
| CN | 109560912 A | 4/2019 |
| CN | 109586853 A | 4/2019 |
| CN | 109644467 A | 4/2019 |
| EP | 3251384 A1 * | 12/2017 ........... H04L 1/1671 |
| RU | 2608575 C1 | 1/2017 |
| RU | 2647488 C2 | 3/2018 |
| WO | 2012146118 A1 | 11/2012 |
| WO | 2012150765 A2 | 11/2012 |
| WO | WO-2019195757 A1 * | 10/2019 ............ H04L 1/08 |
| WO | 2020188815 A1 | 9/2020 |
| WO | 2020/223984 A1 | 11/2020 |

OTHER PUBLICATIONS

The First Office Action issued in corresponding Chinese Application No. 202011086661.2, dated Oct. 9, 2021, 18 pages.
"Remaining details on short-PUCCH", Agenda item: 7.3.2.1.1, Source: Spreadtrum Communications, 3GPP TSG RAN WG1 Meeting #93, R1-1806400, Busan, Korea, May 21-25, 2018, 5 pages.
Extended European Search Report issued in corresponding European Application No. EP 19927678.3, dated Sep. 24, 2021, 9 pages.
The First Office Action issued in corresponding India Application No. 202117009167, dated Jan. 25, 2022, 6 pages.
Second Office Action issued in corresponding Russian Application No. 2021109553, dated May 27, 2022.
Office Action issued in corresponding Canadian Application No. 3,114,125, dated Mar. 28, 2022, 4 pages.
Extended European Search Report issued in corresponding European application No. 22209707.3, dated Mar. 9, 2023.
Notice of Allowance issued in corresponding Canadian application No. 3,114,125, dated Mar. 30, 2023.
First Office Action issued in corresponding Japanese application No. 2021-516739, dated Apr. 18, 2023.
Samsung, "Discussion on DL SPS", R1-1906961, 3GPP TSG RAN WG1 #97 Reno, USA, May 13-17, 2019.
WILUS Inc., "On Shorter SPS PDSCH Periodicity for NR URLLC", R1-1905434, 3GPP TSG RAN WG1 #96bis Xi'an, China, Apr. 8-12, 2019.
LG Electronics, "Remaining issues on CA and HARQ-ACK codebook", R1-1802217, 3GPP TSG RAN WG1 Meeting #92 Athens, Greece, Feb. 26-Mar. 2, 2018.
3GPP TS 38.214 V15.5.0 (Mar. 2019); Technical Specification Group Radio Access Network; NR; Physical layer procedures for data (Release 15).

* cited by examiner

RESOURCE CONFIGURATION METHOD AND APPARATUS, COMPUTER DEVICE AND STORAGE MEDIUM

CROSS-REFERENCE TO RELATED APPLICATIONS

The present application is a continuation of International Application No. PCT/CN2019/086297, filed on May 9, 2019, the contents of which are hereby incorporated by reference in its entirety.

BACKGROUND

The present disclosure relates to the field of communication, and in particular to a resource configuration method, device, computer device, and storage medium.

In a New Radio (NR) system, data transmission methods include two types of dynamic transmission and semi-persistent schedule (SPS) transmission.

In NR Release-15 (Rel-15), as shown in FIG. 1, an SPS Physical Downlink Control Channel (PDCCH) corresponds to a Physical Uplink Control Channel (PUCCH), and after a network device transmits data to a terminal through a Physical Downlink Shared Channel (PDSCH) resource, the terminal transmits to the network device Acknowledgement/Negative Acknowledgement (ACK/NACK) information for the data transmitted on the SPS PDSCH resource through a corresponding PUCCH resource.

However, because 5G (NR) introduces Ultra-reliable low latency (URLLC) service, an SPS period corresponding to this service will be shortened, and the existing configuration method in which an SPS PDSCH corresponds to a PUCCH resource will result in a situation where no PUCCH resource is available for some SPS PDSCH resources.

SUMMARY

In a first aspect of embodiments of the present disclosure, there is provided a resource configuration method, including receiving, by a terminal, configuration information transmitted by a network device, the configuration information being used for indicating at least one physical uplink control channel PUCCH resource which is used for transmitting feedback response information corresponding to a plurality of downlink semi-persistent scheduling resources.

In a second aspect of embodiments of the present disclosure, there is provided a resource configuration method, including transmitting, by a network device, configuration information to a terminal, the configuration information being used for indicating at least one PUCCH resource which is used for transmitting feedback response information corresponding to a plurality of downlink semi-persistent scheduling resources.

In a third aspect of embodiments of the present disclosure, there is provided a resource configuration device including a receiving module and a processing module, the processing module is configured to receive configuration information transmitted by a network device through the receiving module, the configuration information being used for indicating at least one physical uplink control channel PUCCH resource which is used for transmitting feedback response information corresponding to a plurality of downlink semi-persistent scheduling resources.

In one of the embodiments, the downlink semi-persistent scheduling resources corresponding to the at least one PUCCH resource are determined according to a preset rule.

In one of the embodiments, the downlink semi-persistent scheduling resources corresponding to the at least one PUCCH resource are determined according to the preset rule, including that a time difference between a position of a last PUCCH resource in the at least one PUCCH resource and a position of a last downlink semi-persistent scheduling resource of the plurality of downlink semi-persistent scheduling resources is not less than a first predetermined value, where the first predetermined value is not less than PDSCH decoding latency.

In one of the embodiments, each of the at least one PUCCH resource corresponds to a group of downlink semi-persistent scheduling resources, and the group of downlink semi-persistent scheduling resources includes one or more downlink semi-persistent scheduling resources.

In one of the embodiments, a difference in numbers of the downlink semi-persistent scheduling resources included in the groups of the downlink semi-persistent scheduling resources corresponding to different PUCCH resources is equal to 0 or 1.

In one of the embodiments, determining the downlink semi-persistent scheduling resources corresponding to the at least one PUCCH resource according to a preset rule includes a time difference between a position of one of the at least one PUCCH resource and an end position of a corresponding downlink semi-persistent scheduling resource being not less than a first predetermined value, where the first predetermined value is not less than PDSCH decoding latency.

In one of the embodiments, determining the downlink semi-persistent scheduling resources corresponding to the at least one PUCCH resource according to a preset rule includes a time difference between a position of the one PUCCH resource and a start position of the corresponding downlink semi-persistent scheduling resource is not less than a second predetermined value, wherein the second predetermined value is greater than the first predetermined value.

In one of the embodiments, a difference in numbers of the downlink semi-persistent scheduling resources corresponding to different PUCCH resources is equal to 0 or 1.

In one of the embodiments, the configuration information is further used for indicating a correspondence between the at least one PUCCH resource and the plurality of downlink semi-persistent scheduling resources.

In one of the embodiments, the plurality of downlink semi-persistent scheduling resources are divided into one or more groups, the configuration information is used for indicating the PUCCH resource corresponding to each group of downlink semi-persistent scheduling resources, and each group of semi-persistent scheduling resource includes at least one downlink semi-persistent scheduling resource.

In one of the embodiments, the configuration information is used for indicating the PUCCH resource corresponding to each group of downlink semi-persistent scheduling resources, including that the configuration information is used for indicating the downlink semi-persistent scheduling resources included in each group of downlink semi-persistent scheduling resources and the corresponding PUCCH resource.

In one of the embodiments, the configuration information is used for indicating at least one physical uplink control channel PUCCH resource, including that the configuration information is used for indicating a target downlink semi-persistent scheduling resource and the PUCCH resource corresponding to the target downlink semi-persistent scheduling resource, and the target downlink semi-persistent scheduling resource is used for determining other downlink semi-persistent scheduling resources in the plurality of downlink semi-persistent scheduling resources.

In one of the embodiments, the target downlink semi-persistent scheduling resource is a first or last one of the plurality of downlink semi-persistent scheduling resources, or the plurality of downlink semi-persistent scheduling resources are divided into one or more groups, and the target downlink semi-persistent scheduling resource is a first or last downlink semi-persistent scheduling resource in a group of downlink semi-persistent scheduling resources.

In one of the embodiments, the configuration information is used for indicating a slot or sub-slot for the PUCCH resource.

In one of the embodiments, the configuration information is used for indicating the slot or sub-slot for the PUCCH resource, including that the configuration information is used for indicating an index number information of the slot or sub-slot for the PUCCH resource.

In one of the embodiments, the configuration information is used for indicating the slot or sub-slot for the PUCCH resource, including that the configuration information is used for indicating a time domain interval between the PUCCH resource and the corresponding downlink semi-persistent scheduling resources.

In one of the embodiments, the configuration information is used for indicating the slot or sub-slot for the PUCCH resource, including that the configuration information is used for indicating a time domain resource and a frequency domain resource in the slot or sub-slot for the PUCCH resource.

In a fourth aspect of embodiments of the present disclosure, there is provided a resource configuration device including a transmitting module and a processing module, wherein the processing module is configured to transmit configuration information to a terminal through the transmitting module, the configuration information being used for indicating at least one PUCCH resource which is used for transmitting feedback response information corresponding to a plurality of downlink semi-persistent scheduling resources.

In one of the embodiments, the downlink semi-persistent scheduling resources corresponding to the at least one PUCCH resource are determined according to a preset rule.

In one of the embodiments, the downlink semi-persistent scheduling resources corresponding to the at least one PUCCH resource are determined according to the preset rule, including that a time difference between a position of a last PUCCH resource in the at least one PUCCH resource and a position of a last downlink semi-persistent scheduling resource of the plurality of downlink semi-persistent scheduling resources is not less than a first predetermined value, where the first predetermined value is not less than PDSCH decoding latency.

In one of the embodiments, each of the at least one PUCCH resource corresponds to a group of downlink semi-persistent scheduling resources, and the group of downlink semi-persistent scheduling resources includes one or more downlink semi-persistent scheduling resources.

In one of the embodiments, a difference in numbers of the downlink semi-persistent scheduling resources included in the groups of the downlink semi-persistent scheduling resources corresponding to different PUCCH resources is equal to 0 or 1.

In one of the embodiments, the downlink semi-persistent scheduling resources corresponding to the at least one PUCCH resource are determined according to the preset rule, including that a time difference between a position of a PUCCH resource in the at least one PUCCH resource and an end position of the corresponding downlink semi-persistent scheduling resources is not less than a first predetermined value, where the first predetermined value is not less than PDSCH decoding latency.

In one of the embodiments, the downlink semi-persistent scheduling resources corresponding to the at least one PUCCH resource are determined according to the preset rule, including that a time difference between the position of the PUCCH resource and a start position of the corresponding downlink semi-persistent scheduling resources is not less than a second predetermined value, wherein the second predetermined value is greater than the first predetermined value.

In one of the embodiments, a difference in numbers of the downlink semi-persistent scheduling resources corresponding to different PUCCH resources is equal to 0 or 1.

In one of the embodiments, the configuration information is further used for indicating a correspondence between the at least one PUCCH resource and the plurality of downlink semi-persistent scheduling resources.

In one of the embodiments, the plurality of downlink semi-persistent scheduling resources are divided into one or more groups, the configuration information is used for indicating the PUCCH resource corresponding to each group of downlink semi-persistent scheduling resources, and each group of semi-persistent scheduling resource includes at least one downlink semi-persistent scheduling resource.

In one of the embodiments, the configuration information is used for indicating the PUCCH resource corresponding to each group of downlink semi-persistent scheduling resources, including that the configuration information is used for indicating the downlink semi-persistent scheduling resources included in each group of downlink semi-persistent scheduling resources and the corresponding PUCCH resource.

In one of the embodiments, the configuration information is used for indicating at least one physical uplink control channel PUCCH resource, including that the configuration information is used for indicating a target downlink semi-persistent scheduling resource and the PUCCH resource corresponding to the target downlink semi-persistent scheduling resource, and the target downlink semi-persistent scheduling resource is used for determining other downlink semi-persistent scheduling resources in the plurality of downlink semi-persistent scheduling resources.

In one of the embodiments, the target downlink semi-persistent scheduling resource is a first or last one of the plurality of downlink semi-persistent scheduling resources, or the plurality of downlink semi-persistent scheduling resources are divided into one or more groups, and the target downlink semi-persistent scheduling resource is a first or last downlink semi-persistent scheduling resource in a group of downlink semi-persistent scheduling resources.

In one of the embodiments, the configuration information is used for indicating a slot or sub-slot for the PUCCH resource.

In one of the embodiments, the configuration information is used for indicating a slot or sub-slot for the PUCCH resource, including that the configuration information is used for indicating an index number information of the slot or sub-slot for the PUCCH resource.

In one of the embodiments, the configuration information is used for indicating the slot or sub-slot for the PUCCH resource, including that the configuration information is used for indicating a time domain interval between the PUCCH resource and the corresponding downlink semi-persistent scheduling resources.

In one of the embodiments, the configuration information is used for indicating the slot or sub-slot for the PUCCH resource, including that the configuration information is used for indicating a time domain resource and a frequency domain resource in the slot or sub-slot for the PUCCH resource.

In a fifth aspect of embodiments of the present disclosure, there is provided a computer device including a memory and a processor, the memory stores a computer program, and the processor implements the steps of the method according to the first aspect when executing the computer program.

In a sixth aspect of embodiments of the present disclosure, there is provided a computer-readable storage medium having stored thereon a computer program which, when being executed by a processor, implements the steps of the method according to the first aspect.

DETAILED DESCRIPTION

In order to make the purposes, technical solutions, and advantages of the present disclosure more clear, the present disclosure will be described in detail below with reference to the drawings and embodiments. It should be understood that the specific embodiments described herein are only used to explain the present disclosure, and are not intended to limit the present disclosure.

Figure 1:
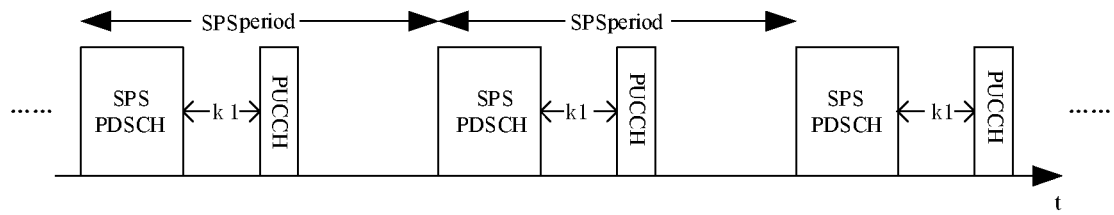
FIG. 1 is a schematic diagram of an SPS period in the prior art according to an embodiment.
Figure 2:
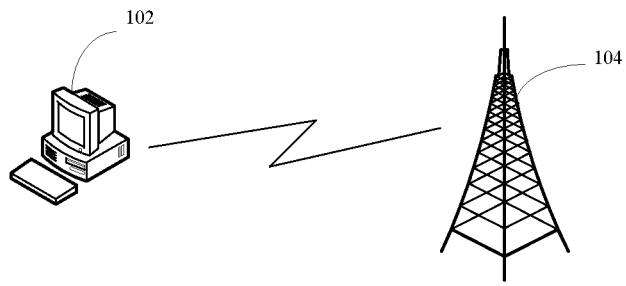
FIG. 2 is a schematic diagram of an application scenario of a resource configuration method according to an embodiment.

The resource configuration method provided in this disclosure can be applied to an application environment as shown in FIG. 2, in which a terminal 102 communicates with a network device 104 through a network. The network device 104 can schedule resources. For example, the network device 104 instructs the terminal 102 to transmit feedback response information of downlink semi-persistent scheduling resources on a PUCCH resource corresponding to the downlink semi-persistent scheduling resources. The terminal 102 can include, but is not limited to, a personal computer, a notebook computer, a smart phone, a tablet computer, and a portable wearable device. The network device 104 can be a base station, which is implemented, for example, by an independent base station or a base station cluster composed of multiple base stations.

It should be noted that in this disclosure, semi-persistent scheduling may also be referred to as semi-static scheduling. In addition, the downlink semi-persistent scheduling resources in this disclosure may also be downlink semi-persistent scheduling resources or SPS PDSCH resources. Moreover, in this embodiment, due to the introduction of skipped SPS, the SPS resources may not necessarily occur. That is, some SPS resources may be idle and will not be occupied. Therefore, when determining a feedback correspondence relationship, the resources are described as objects.

Figure 3:
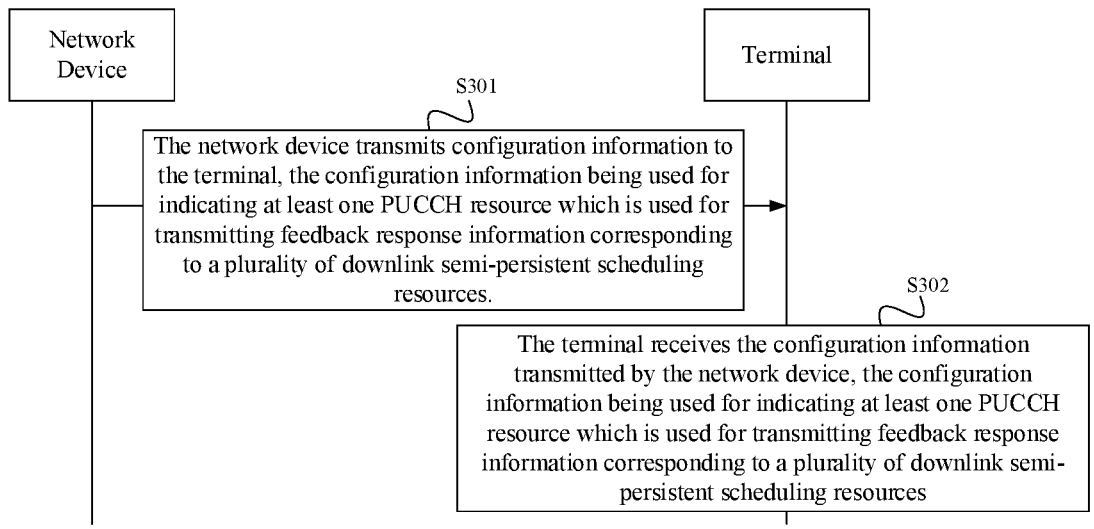
FIG. 3 is a flowchart of a resource configuration method according to an embodiment of the present disclosure.

FIG. 3 is a flowchart of a resource configuration method according to an embodiment of the present disclosure. The method relates to a specific implementation process in which a terminal receives configuration information transmitted by a network device and can transmit feedback response information of downlink semi-persistent scheduling resources on a PUCCH resource indicated by the network device. As shown in FIG. 3, the method includes the following steps.

In S301, a network device transmits configuration information to a terminal, the configuration information being used for indicating at least one PUCCH resource, which is used for transmitting feedback response information corresponding to a plurality of downlink semi-persistent scheduling resources.

The configuration information is used for indicating at least one PUCCH resource, and the PUCCH resource can be used for transmitting the feedback response information corresponding to the plurality of downlink semi-persistent scheduling resources. In specific, the configuration information can be used for indicating a slot or sub-slot for the PUCCH, a time domain resource and a frequency domain resource in the slot or sub-slot for the PUCCH, or the like. For example, it can be used for indicating an absolute position of the slot or sub-slot for the PUCCH, such as an index number of the slot or sub-slot in a frame period, the index number of the slot or sub-slot in a frame of 10 ms, or the like.

Optionally, the configuration information may be one piece of information or multiple pieces of information. For example, in initial configuration, the network device transmits a configuration message to notify the terminal of the PUCCH resource corresponding to a part of the downlink SPS resources. If there is any downlink SPS resource newly added subsequently, the configuration message can be transmitted to the terminal again to notify the terminal of the PUCCH resource corresponding to the newly added downlink SPS resource.

Figure 4:
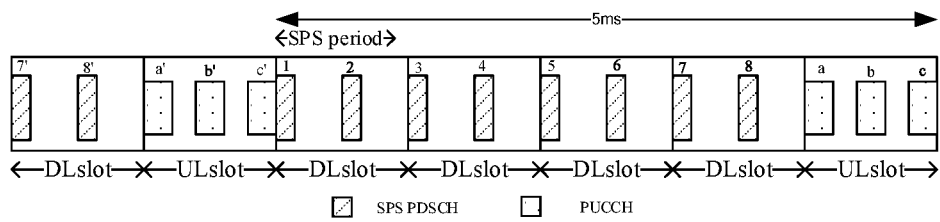
FIG. 4 is a schematic diagram of a slot scenario according to an embodiment.

In the present embodiment, the network device can transmit the configuration information to the terminal to instruct the terminal to transmit the feedback response information corresponding to the downlink semi-persistent scheduling resources on the PUCCH resource indicated by the configuration information. The network equipment can clearly indicate the PUCCH resource corresponding to each downlink semi-persistent scheduling resource. As shown in FIG. 4, the frame structure has a period of 5 ms, the first 4 slots in each period are downlink (DL) slots, and the last one slot is the uplink (UL) slot. A period of the SPS resource is 7 symbols (half slot), and each downlink slot includes two SPS resource transmission resources. Three PUCCH resources are reserved in the uplink slot for transmitting ACK/NACK information of SPS resource transmission resources. The network device indicates PUCCH resources a, b, and c in the frame period. The network device instructs the terminal to transmit the feedback response information for downlink semi-persistent scheduling resources 1, 2, and 3 on PUCCH resource a, transmit the feedback response information for downlink semi-persistent scheduling resources 4, 5, and 6 on PUCCH resource b, and transmit the feedback response information for downlink semi-persistent scheduling resources 7 and 8 on PUCCH resource c.

Alternatively, the network device indicates the PUCCH resources, and the terminal allocates PUCCH resources to the downlink semi-persistent scheduling resources by itself. Taking FIG. 4 as an example, if the network device instructs the terminal to transmit the feedback response information for the downlink semi-persistent scheduling resources on PUCCH resource a and PUCCH resource b, but does not indicate the feedback response information of which downlink semi-persistent scheduling resources is transmitted on PUCCH resource a and the feedback response information of which downlink semi-persistent scheduling resources is transmitted on PUCCH resource b, the terminal performs resource allocation. For example, the terminal can adopt an equal division principle to allocate PUCCH resource a for transmitting the feedback response information for the downlink semi-persistent scheduling resources 1-4, and allocate PUCCH resource b for transmitting the feedback response information for the downlink semi-persistent scheduling resources 5-8. The network device can also adopt other indication manners, which are not limited in this disclosure.

In S302, the terminal receives the configuration information transmitted by the network device, the configuration information being used for indicating at least one PUCCH resource, which is used for transmitting feedback response information corresponding to a plurality of downlink semi-persistent scheduling resources.

In the present embodiment, after the terminal receives the configuration information, it can transmit the feedback response information corresponding to the downlink semi-persistent scheduling resources on the PUCCH indicated by the configuration information, that is, after the network device transmits data to the terminal on the downlink semi-persistent scheduling resources, the terminal needs to feed back the feedback response information for the data on the PUCCH resource indicated by the configuration information. Optionally, the feedback response information may be ACK/NACK information.

As shown in FIG. 4, the network device instructs the terminal to transmit the feedback response information for downlink semi-persistent scheduling resources 1, 2, and 3 on downlink semi-persistent scheduling resource a. After the network device transmits data to the terminal on any of the downlink semi-persistent scheduling resources 1, 2, and 3, the terminal responses with ACK/NACK information on PUCCH resource a.

In the resource configuration method provided in the present embodiment, the network device transmits the configuration information to the terminal, and since the configuration information is used for indicating at least one PUCCH resource which is used for transmitting the feedback response information corresponding to the plurality of downlink semi-persistent scheduling resources, the terminal can transmit the feedback response information for the downlink semi-persistent scheduling resources on the PUCCH resource indicated by the configuration information, or the plurality of SPS resources can share one PUCCH resource, so that there is a corresponding PUCCH resource for transmitting the feedback response information for each of the downlink semi-persistent scheduling resources, which avoids the situation where there is no PUCCH resource available for some downlink semi-persistent scheduling resources in the related art, and ensures the data transmission quality.

In the embodiment shown in FIG. 3, the terminal can transmit the feedback response information corresponding to the plurality of downlink semi-persistent scheduling resources on the PUCCH resource indicated by the network device, and it is necessary for the terminal to obtain the plurality of downlink semi-persistent scheduling resources allocated by the network device. Optionally, the base station may simultaneously indicate the plurality of downlink semi-persistent scheduling resources available to the terminal in the above configuration information. Alternatively, the base station may also indicate the plurality of downlink semi-persistent scheduling resources available to the terminal through other signaling messages than the configuration information.

The resource configuration method provided by the foregoing embodiment can be used in Time Division Duplexing (TDD) or other scenarios where there are more DL slots than UL slots. Since there are more DL slots than UL slots, there are more downlink semi-persistent scheduling resources than the PUCCH resources, and the plurality of downlink semi-persistent scheduling resources may share one PUCCH resource. Optionally, the plurality of downlink semi-persistent scheduling resources are on a TDD carrier. Optionally, the period of the plurality of downlink semi-persistent scheduling resources is less than an uplink-downlink switching period, which can ensure that the period of the plurality of downlink semi-persistent scheduling resources corresponds to at least one PUCCH resource.

In the embodiment shown in FIG. 3, the network device can use various schemes to indicate to the terminal the PUCCH resource corresponding to each downlink semi-persistent scheduling resource. The following two schemes, Scheme 1 and Scheme 2, are used to detail the specific implementations in which the network device indicates to the terminal the PUCCH resource corresponding to each downlink semi-persistent scheduling resource.

Scheme 1: In some scenarios, small signaling overhead is required. For example, if the available bandwidth of the transmission resource is small, the network device indicates the PUCCH resource, and the terminal allocates the PUCCH resource to the downlink semi-persistent scheduling resources by itself.

In this embodiment, the network device can indicate to the terminal which PUCCH resources can be used, but does not specifically indicate which PUCCH resource can be used for which downlink semi-persistent scheduling resources, then the downlink semi-persistent scheduling resources corresponding to at least one PUCCH resource are determined according to a preset rule. That is, the terminal can determine the downlink semi-persistent scheduling resources corresponding to at least one PUCCH resource according to the preset rule, thereby reducing signaling overhead.

As shown in FIG. 4, the network device indicates to the terminal that PUCCH resources a, b, and c can be used. However, the network equipment does not clearly define the correspondence between each downlink semi-persistent scheduling resource and each PUCCH resource. Therefore, the terminal needs to determine which PUCCH resources are used to transmit ACK/NACK information for which downlink semi-persistent scheduling resources according to the preset rules. The specific implementation in which "the downlink semi-persistent scheduling resources corresponding to at least one PUCCH resource are determined according to a preset rule" is described in detail below by way of Manner a and Manner b.

Manner a: a time difference between a position of a last PUCCH resource in the at least one PUCCH resource and a position of a last downlink semi-persistent scheduling resource of the plurality of downlink semi-persistent scheduling resources is not less than a first predetermined value, where the first predetermined value is not less than PDSCH decoding latency.

In this embodiment, a range of the downlink semi-persistent scheduling resources can be determined for the at least one PUCCH according to the first predetermined value. For example, the position of the last downlink semi-persistent scheduling resource corresponding to the position of the last PUCCH resource in the at least one PUCCH resource can be determined according to the first predetermined value, that is, the time difference between the position of the last PUCCH resource and the position of each downlink semi-persistent scheduling resource is obtained, and if the time difference is less than the first predetermined value, it indicates that this downlink semi-persistent scheduling resource is not the last downlink semi-persistent scheduling resource, and if the time difference is greater than or equal to the first predetermined value, it indicates that this downlink semi-persistent scheduling resource is the last downlink semi-persistent scheduling resource. As shown in FIG. 4, the end position of the downlink semi-persistent scheduling resource corresponding to the last PUCCH resource c in the frame period is determined so as to determine the range of the downlink semi-persistent scheduling resources corresponding to each of PUCCH resources a, b, and c. For example, the distance between the downlink SPS resource 8 and the PUCCH resource c is less than the first predetermined value, and the distance between the downlink SPS resource 7 and the PUCCH resource c is greater than the first predetermined value, and thus the terminal determines that PUCCH resources a, b, and c carry ACK/NACK information corresponding to SPS resource transmission resources 8' and 1~7.

After the downlink SPS resource range corresponding to the at least one PUCCH resource is determined, the downlink SPS resources in the downlink SPS resource range can also be evenly grouped, and a principle that "a difference in numbers of the downlink semi-persistent scheduling resources included in the downlink semi-persistent scheduling resource groups corresponding to different PUCCH resources is equal to 0 or 1" can be used to ensure that an amount of information carried on each PUCCH resource is relatively balanced. Optionally, each PUCCH resource in the at least one PUCCH resource corresponds to one downlink semi-persistent scheduling resource group, and one downlink semi-persistent scheduling resource group includes one or more downlink semi-persistent scheduling resources. For example, the terminal allocates downlink semi-persistent scheduling resources 1-3 to PUCCH resource a, downlink semi-persistent scheduling resources 4-6 to PUCCH resource b, and downlink semi-persistent scheduling resources 7 and 8 to PUCCH resource c.

Manner b: a time difference between a position of a PUCCH resource in the at least one PUCCH resource and an end position of the corresponding downlink semi-persistent scheduling resources is not less than a first predetermined value, where the first predetermined value is not less than the PDSCH decoding latency.

In this embodiment, the end position of the downlink semi-persistent scheduling resources corresponding to the position of the PUCCH resource in the at least one PUCCH resource can be determined according to the first predetermined value. For example, in FIG. 4, downlink semi-persistent scheduling resources 1-3 are to be allocated to PUCCH resource a, then the distance between the downlink semi-persistent scheduling resource 3 and the PUCCH resource a is calculated. If the distance is greater than the first predetermined value, the downlink semi-persistent scheduling resource 3 can be determined as the end position of the downlink semi-persistent scheduling resources corresponding to PUCCH resource a. If the distance between downlink semi-persistent scheduling resource 3 and PUCCH resource a is not greater than the first predetermined value, the distance between the downlink semi-persistent scheduling resource 2 and the PUCCH resource a is calculated until the distance between the downlink semi-persistent scheduling resource and the PUCCH resource a is greater than the first predetermined value. After determining the end position of the downlink semi-persistent scheduling resources corresponding to one PUCCH resource, it can be determined for which downlink semi-persistent scheduling resources the other PUCCH resources can be used for transmitting the feedback response information. As shown in FIG. 4, it can be determined that the end position of the SPS resources corresponding to the PUCCH resource a is the downlink semi-persistent scheduling resource 2, and by using the principle that "a difference in the numbers of the downlink semi-persistent scheduling resources included in the downlink semi-persistent scheduling resource groups corresponding to different PUCCH resources is equal to 0 or 1", it can be determined that the end positions of the SPS resources corresponding to the PUCCH resources b and c are downlink semi-persistent scheduling resource 5 and downlink semi-persistent scheduling resource 7, then PUCCH resource a carries the feedback response information corresponding to downlink semi-persistent scheduling resources 8', 1, and 2, where the interval between downlink semi-persistent scheduling resource 2 and PUCCH resource a is greater than the first predetermined value; PUCCH resource b carries the feedback response information corresponding to downlink semi-persistent scheduling resources 3, 4, and 5, where the interval between downlink semi-persistent scheduling resource 5 and PUCCH resource b is greater than the first predetermined value; PUCCH resource c carries the feedback response information corresponding to downlink semi-persistent scheduling resources 6 and 7.

Further, in order to more quickly determine the downlink semi-persistent scheduling resources corresponding to each PUCCH resource, the downlink semi-persistent scheduling resources corresponding to the at least one PUCCH resource are determined according to the preset rule, including that a time difference between the position of the PUCCH resource and a start position of the corresponding downlink semi-persistent scheduling resources is not less than a second predetermined value, where the second predetermined value is greater than the first predetermined value.

In this embodiment, the start position of the downlink semi-persistent scheduling resources corresponding to a PUCCH resource in the at least one PUCCH resource can also be determined according to the second predetermined value. For example, if it is determined that the start position of the downlink semi-persistent scheduling resources corresponding to PUCCH resource b is downlink semi-persistent scheduling resource 3, and the end position is downlink semi-persistent scheduling resource 5, it is determined that the downlink semi-persistent scheduling resources corresponding to PUCCH resource b are downlink semi-persistent scheduling resources 3, 4 and 5. Optionally, the second predetermined value can also be a value not less than a sum of the PDSCH decoding latency and PUCCH preparing latency.

Optionally, in Manner a and Manner b, the first predetermined value is not less than the sum of the PDSCH decoding latency and the PUCCH preparing latency. Optionally, the difference in the numbers of the downlink semi-persistent scheduling resources corresponding to different PUCCH resources is equal to 0 or 1, which can make the amount of data transmission on each PUCCH resource more balanced, avoid the phenomenon of congestion or packet loss due to the large amount of data transmitted on some PUCCH resources, and ensure the transmission rate and reliability.

In this embodiment, the time difference between the position of a PUCCH resource in the at least one PUCCH resource and the end position of the corresponding downlink semi-persistent scheduling resources is not less than the first predetermined value, and the time difference between the position of the PUCCH resource and the start position of the corresponding downlink semi-persistent scheduling resources is not less than the second predetermined value, and the downlink semi-persistent scheduling resources corresponding to each PUCCH resource can be quickly and accurately determined.

Scheme 2: The network device not only indicates the PUCCH resource available to the terminal, but also indicates the configuration manner of the PUCCH resource. That is, the configuration information is used for indicating the PUCCH resource and the downlink semi-persistent scheduling resources corresponding to the PUCCH resource. The indication manner of the network device is described in detail below by way of Manner c and Manner d.

Manner c: The configuration information is further used for indicating a correspondence between at least one PUCCH resource and the plurality of downlink semi-persistent scheduling resources.

In this embodiment, the network device can indicate, in the configuration information, the correspondence between the at least one PUCCH resource and the plurality of downlink semi-persistent scheduling resources, indicate the range of the plurality of downlink semi-persistent scheduling resources corresponding to the at least one PUCCH resource, or clearly indicate the correspondence between each PUCCH resource and the downlink semi-persistent scheduling resources.

Method d: The plurality of downlink semi-persistent scheduling resources are divided into one or more groups, and the configuration information is used for indicating the PUCCH resource corresponding to each group of downlink semi-persistent scheduling resources, where each group of downlink semi-persistent scheduling resources includes at least one downlink semi-persistent scheduling resource.

In this embodiment, the network device can group the plurality of downlink semi-persistent scheduling resources, and indicate for which downlink semi-persistent scheduling resources each group of PUCCH resources is used for transmitting the feedback response information, so as to reduce the complexity on the terminal side. As shown in FIG. 4, the network device divides the downlink semi-persistent scheduling resources into 3 groups, the first group includes downlink semi-persistent scheduling resources 1-3 and corresponds to PUCCH resource a; the second group includes downlink semi-persistent scheduling resources 4-6 and corresponds to PUCCH resource b; and the third group includes downlink semi-persistent scheduling resources 7 and 8 and corresponds to PUCCH resource c.

Optionally, the configuration information is used for indicating the PUCCH resource corresponding to each group of downlink semi-persistent scheduling resources, including that the configuration information is used for indicating the downlink semi-persistent scheduling resources included in each group of downlink semi-persistent scheduling resources and the corresponding PUCCH resource.

In this embodiment, the network device indicates which SPS resources are included in a group of downlink semi-persistent scheduling resources and the PUCCH resource corresponding to this group. For example, downlink semi-persistent scheduling resource group 1 includes downlink semi-persistent scheduling resources 1, 2, and 3, and the corresponding PUCCH resource is PUCCH resource a; downlink semi-persistent scheduling resource group 2 includes downlink semi-persistent scheduling resources 4, 5, and 6, and the corresponding PUCCH resource is PUCCH resource b; and the downlink semi-persistent scheduling resource group 3 includes downlink semi-persistent scheduling resources 7 and 8, and the corresponding PUCCH resource is PUCCH resource c. For another example, downlink semi-persistent scheduling resource group 1 includes downlink semi-persistent scheduling resources 8', 1 and 2, and the corresponding PUCCH resource is PUCCH resource a; downlink semi-persistent scheduling resource group 2 includes downlink semi-persistent scheduling resources 3, 4, and 5, and the corresponding PUCCH resource is PUCCH resource b; and downlink semi-persistent scheduling resource group 3 includes downlink semi-persistent scheduling resources 6 and 7, and the corresponding PUCCH resource is PUCCH resource c. With this method, the indication by the network device is accurate, non-contiguous grouping is supported, and understanding ambiguity can be avoided.

Manner e: The configuration information is used for indicating at least one physical uplink control channel PUCCH resource, including that the configuration information is used for indicating a target downlink semi-persistent scheduling resource and the PUCCH resource corresponding to the target downlink semi-persistent scheduling resource, where the target downlink semi-persistent scheduling resource is used for determining other downlink semi-persistent scheduling resources in the plurality of downlink semi-persistent scheduling resources.

In this embodiment, the configuration information can indicate some target downlink semi-persistent scheduling resources and the PUCCH resource corresponding to the target downlink semi-persistent scheduling resources. A group of downlink semi-persistent scheduling resources can be determined according to the target downlink semi-persistent scheduling resources and the PUCCH resource corresponding to the target downlink semi-persistent scheduling resources, and the PUCCH resources corresponding to other groups of downlink semi-persistent scheduling resources can be derived by the predetermined rule without specifying the PUCCH resource corresponding to each group of downlink semi-persistent scheduling resources, which can save signaling overhead. For example, in FIG. 4, the configuration information indicates that the first downlink semi-persistent scheduling resource in a group of downlink semi-persistent scheduling resources is downlink semi-persistent scheduling resource 1, this downlink semi-persistent scheduling resource corresponds to PUCCH resource a, and thus it can be determined based on "a difference in the numbers of the downlink semi-persistent scheduling resources corresponding to different PUCCH resources is equal to 0 or 1" that the group of downlink semi-persistent scheduling resources includes downlink semi-persistent scheduling resources 1-3, and by using the allocation principle of 3, 3, and 2, for example, it can be determined that a group of downlink semi-persistent scheduling resources 4-6 corresponds to PUCCH resource b, and another group of downlink semi-persistent scheduling resources 7 and 8 corresponds to PUCCH resource c.

Optionally, the target downlink semi-persistent scheduling resource is the first or last one of the plurality of downlink semi-persistent scheduling resources, or the plurality of downlink semi-persistent scheduling resources are divided into one or more groups, and the target downlink semi-persistent scheduling resource is the first or last downlink semi-persistent scheduling resource in one of the groups of downlink semi-persistent scheduling resources.

In this embodiment, the network device implicitly indicates the downlink semi-persistent scheduling resources and the corresponding PUCCH resource, which can reduce signaling overhead. For example, the network device indicates the PUCCH resource corresponding to the first or last one of the plurality of downlink semi-persistent scheduling resources, the range of the plurality of downlink semi-persistent scheduling resources corresponding to the PUCCH resource can be determined, and the downlink semi-persistent scheduling resources corresponding to each PUCCH resource can be determined according to the predetermined rule. Alternatively, the network device indicates the first or last downlink semi-persistent scheduling resource in a certain group of downlink semi-persistent scheduling resources and the PUCCH resource corresponding to this group. Preferably, it indicates the last downlink semi-persistent scheduling resource in each group. For example, the network device indicates that downlink semi-persistent scheduling resource 3 corresponds to PUCCH resource a, and thus it can be determined that downlink semi-persistent scheduling resources 1~3 correspond to PUCCH resource a, and further, according to the predetermined rule, it can be determined that downlink semi-persistent scheduling resources 4 to 6 correspond to PUCCH resource b, and downlink semi-persistent scheduling resources 7 to 8 correspond to PUCCH resource c.

On the basis of the foregoing embodiments, the network device can also use different methods to indicate the position of the PUCCH resource corresponding to the plurality of downlink semi-persistent scheduling resources. Optionally, the configuration information is used for indicating the slot or sub-slot for the PUCCH resource corresponding to each group of downlink semi-persistent scheduling resources. The indication of the slot or sub-slot for the PUCCH can be implemented in the following manners.

Manner f: The configuration information is used for indicating index number information of the slot or sub-slot for the PUCCH resource. In this embodiment, the network device directly indicates an absolute position of the slot or sub-slot for the PUCCH resource, such as the index number of the slot or sub-slot for the PUCCH resource in a frame period, or the index number of the slot or sub-slot in a 10 ms frame.

Manner g: The configuration information is used for indicating a time domain interval between the PUCCH resource and the corresponding downlink semi-persistent scheduling resources. In this embodiment, the network device indicates a relative position of the downlink semi-persistent scheduling resources and the corresponding PUCCH resource, for example, indicates the time interval between the slot for the downlink semi-persistent scheduling resources and the slot for the corresponding PUCCH resource.

Manner h: The configuration information is used for indicating a time domain resource and a frequency domain resource in the slot or sub-slot for the PUCCH resource. For example, the network device directly indicates a symbol position and a carrier position in the slot or sub-slot for the PUCCH resource corresponding to each group of downlink semi-persistent scheduling resources.

It should be understood that although the steps in the flowchart of FIG. 3 are sequentially shown in the guidance of arrows, these steps are not necessarily performed sequentially in the order indicated by the arrows. Unless explicitly specified herein, the order of these steps is not strictly limited, and these steps can be performed in other orders. Moreover, at least a part of the steps in FIG. 3 may include multiple sub-steps or multiple stages, which are not necessarily performed at the same time, and may be performed at different times. These sub-steps or stages are not necessarily performed sequentially, and may be performed in turn or alternately with other steps or at least a part of sub-steps or stages of the other steps.

Figure 5:
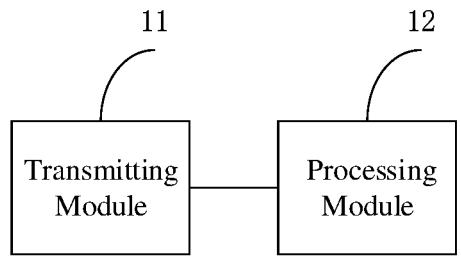
FIG. 5 is a block diagram of a resource configuration device according to an embodiment of the present disclosure.

FIG. 5 is a block diagram of a resource configuration device provided by an embodiment of the present disclosure. As shown in FIG. 5, the device includes a transmitting module 11 and a processing module 12.

The processing module 12 is configured to transmit configuration information to a terminal through the transmitting module 11, the configuration information being used for indicating at least one PUCCH resource, which is used for transmitting feedback response information corresponding to a plurality of downlink semi-persistent scheduling resources.

Figure 6:
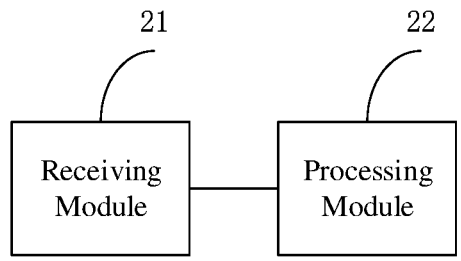
FIG. 6 is a block diagram of a resource configuration device according to another embodiment of the present disclosure.

FIG. 6 is a block diagram of a resource configuration device provided by another embodiment of the present disclosure. As shown in FIG. 6, the device includes a receiving module 21 and a processing module 22.

The processing module 22 is configured to receive configuration information transmitted by a network device through the receiving module 21, the configuration information being used for indicating at least one physical uplink control channel PUCCH resource, which is used for transmitting feedback response information corresponding to a plurality of downlink semi-persistent scheduling resources.

In one of the embodiments, the downlink semi-persistent scheduling resources corresponding to the at least one PUCCH resource are determined according to a preset rule.

In one of the embodiments, the downlink semi-persistent scheduling resources corresponding to the at least one PUCCH resource are determined according to the preset rule, including that a time difference between a position of a last PUCCH resource in the at least one PUCCH resource and a position of a last downlink semi-persistent scheduling resource in the plurality of downlink semi-persistent scheduling resources is not less than a first predetermined value, where the first predetermined value is not less than PDSCH decoding latency.

In one of the embodiments, each of the at least one PUCCH resource corresponds to a group of downlink semi-persistent scheduling resources, and the group of downlink semi-persistent scheduling resources includes one or more downlink semi-persistent scheduling resources.

In one of the embodiments, a difference in numbers of the downlink semi-persistent scheduling resources included in the groups of the downlink semi-persistent scheduling resources corresponding to different PUCCH resources is equal to 0 or 1.

In one of the embodiments, the downlink semi-persistent scheduling resources corresponding to the at least one PUCCH resource are determined according to the preset rule, including that a time difference between a position of a PUCCH resource in the at least one PUCCH resource and an end position of the corresponding downlink semi-persistent scheduling resources is not less than a first predetermined value, where the first predetermined value is not less than the PDSCH decoding latency.

In one of the embodiments, the downlink semi-persistent scheduling resources corresponding to the at least one PUCCH resource are determined according to the preset rule, including that a time difference between the position of the PUCCH resource and a starting position of the corresponding downlink semi-persistent scheduling resources is not less than a second predetermined value, where the second predetermined value is greater than the first predetermined value.

In one of the embodiments, a difference in numbers of the downlink semi-persistent scheduling resources corresponding to different PUCCH resources is equal to 0 or 1.

In one of the embodiments, the configuration information is used for indicating a correspondence between the at least one PUCCH resource and the plurality of downlink semi-persistent scheduling resources.

In one of the embodiments, the plurality of downlink semi-persistent scheduling resources are divided into one or more groups, the configuration information is used for indicating the PUCCH resource corresponding to each group of downlink semi-persistent scheduling resources, and each group of semi-persistent scheduling resource includes at least one downlink semi-persistent scheduling resource.

In one of the embodiments, the configuration information is used for indicating the PUCCH resource corresponding to each group of downlink semi-persistent scheduling resources, including that the configuration information is used for indicating the downlink semi-persistent scheduling resources included in each group of downlink semi-persistent scheduling resources and the corresponding PUCCH resource.

In one of the embodiments, the configuration information is used for indicating at least one physical uplink control channel PUCCH resource, including that the configuration information is used for indicating a target downlink semi-persistent scheduling resource and the PUCCH resource corresponding to the target downlink semi-persistent scheduling resource, and the target downlink semi-persistent scheduling resource is used for determining other downlink semi-persistent scheduling resources in the plurality of downlink semi-persistent scheduling resources.

In one of the embodiments, the target downlink semi-persistent scheduling resource is a first or last one of the plurality of downlink semi-persistent scheduling resources, or the plurality of downlink semi-persistent scheduling resources are divided into one or more groups, and the target downlink semi-persistent scheduling resource is a first or last downlink semi-persistent scheduling resource in one of the groups of downlink semi-persistent scheduling resources.

In one of the embodiments, the configuration information is used for indicating a slot or sub-slot for the PUCCH resource.

In one of the embodiments, the configuration information is used for indicating the slot or sub-slot for the PUCCH resource, including that the configuration information is used for indicating index number information of the slot or sub-slot for the PUCCH resource.

In one of the embodiments, the configuration information is used for indicating the slot or sub-slot for the PUCCH resource, including that the configuration information is used for indicating a time domain interval between the PUCCH resource and the corresponding downlink semi-persistent scheduling resources.

In one of the embodiments, the configuration information is used for indicating the slot or sub-slot for the PUCCH resource, including that the configuration information is used for indicating a time domain resource and a frequency domain resource in the slot or sub-slot for the PUCCH.

The foregoing embodiments provide a resource configuration processing device, and the implementation principle and technical effect thereof are similar to those of the foregoing method embodiments, and will not be repeated here.

For the specific limitations of the resource configuration device, reference can be made to the above limitations on the resource configuration method, which will not be repeated here. Each module in the above-mentioned resource configuration device can be implemented entirely or in part in software, hardware, or a combination thereof. The foregoing modules may be embedded in or independent of a processor of a computer device in the form of hardware, or may be stored in the memory of the computer device in the form of software so that they can be invoked by the processor to perform the operations corresponding to the above modules.

Figure 7:
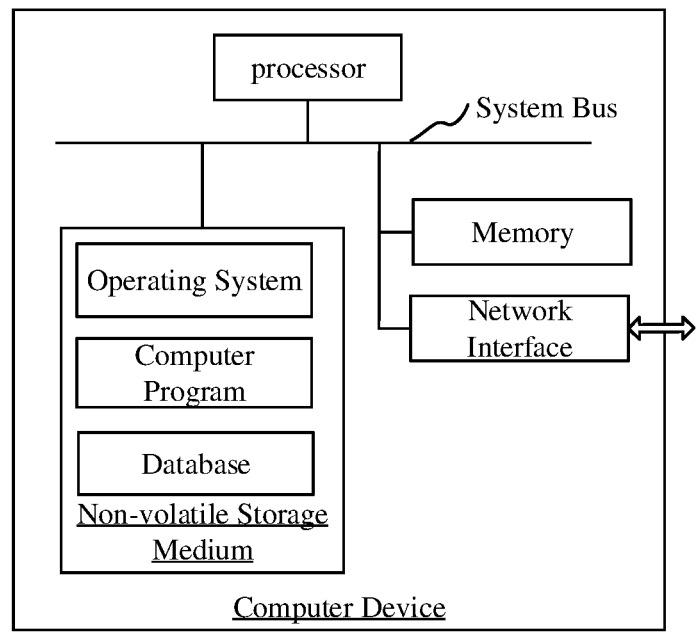
FIG. 7 is a structural block diagram of a device according to an embodiment of the present disclosure.

In an embodiment, there is provided a computer device which can be a network device or a terminal, and the internal structure thereof is as shown in FIG. 7. The computer device includes a processor, a memory, a network interface and a database connected by a system bus. The processor of the computer device is used to provide computation and control capabilities. The memory of the computer device includes a non-volatile storage medium and an internal memory. The non-volatile storage medium stores an operating system, a computer program, and a database. The internal memory provides an environment for operations of the operating system and the computer program in the non-volatile storage medium. The database of the computer device is used to store resource configuration data. The network interface of the computer device is used to communicate with an external terminal through a network connection. The computer program is executed by the processor to implement the resource configuration method.

Those skilled in the art can understand that the structure shown in FIG. 7 is only a block diagram of part of the structure related to the solution of the present disclosure, and does not constitute a limitation on the computer device to which the solution of the present disclosure is applied. The specific computer device may include more or less parts than those shown in the figure, combine some of the parts, or have a different arrangement of the parts.

In an embodiment, there is provided a computer device including a memory and a processor, and the memory stores a computer program which, when being executed by the processor, implements the method described in the embodiment of FIG. 3.

The implementation principle and technical effect of the computer device provided by the above embodiment are similar to those of the foregoing method embodiments, and will not be repeated here.

In an embodiment, there is provided a computer-readable storage medium having stored thereon a computer program which, when being executed by a processor, implements the method described in the embodiment of FIG. 3.

The implementation principle and technical effect of the computer readable storage medium provided by the above embodiment are similar to those of the foregoing method embodiments, and will not be repeated here.

A person of ordinary skill in the art can understand that all or part of the processes in the above-mentioned embodiments of the methods can be implemented by instructing relevant hardware through a computer program. The computer program can be stored in a non-volatile computer readable storage medium, and when the computer program is executed, it may include the flows of the above-mentioned method embodiments. Any reference to the memory, the storage, the database or other media used in the embodiments provided in this disclosure may include a non-volatile and/or a volatile memory. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache memory. As an illustration and not a limitation, the RAM is available in many forms such as a static RAM (SRAM), a dynamic RAM (DRAM), a synchronous DRAM (SDRAM), a double data rate SDRAM (DDRSDRAM), an enhanced SDRAM (ESDRAM), a synchronous link (Synchlink) DRAM (SLDRAM), a Rambus direct RAM (RDRAM), a direct Rambus dynamic RAM (DRDRAM), a Rambus dynamic RAM (RDRAM), etc.

The technical features of the above embodiments can be combined arbitrarily. In order to make the description concise, not all possible combinations of the technical features in the above embodiments are described. However, the combinations of these technical features should be considered as within the scope of the disclosure in this specification as long as there is no contradiction. The above-mentioned embodiments only illustrate several implementations of the present disclosure, and the description thereof is relatively specific and detailed, but it should not be understood as a limitation on the scope of the present disclosure. It should be noted that for those of ordinary skill in the art, modifications and improvements can be made without departing from the concept of this disclosure, which all fall within the protection scope of this disclosure. Therefore, the protection scope of this disclosure shall be defined by the appended claims.

What is claimed is:

1. A resource configuration method in New Radio (NR), comprising:
receiving, by one terminal, configuration information transmitted by a network device, the configuration information being used for indicating at least one physical uplink control channel (PUCCH) resource, wherein the at least one PUCCH resource is used for transmitting feedback response information corresponding to a plurality of downlink semi-persistent scheduling resources configured for the one terminal, and the at least one PUCCH resource comprises a plurality of PUCCH resources in one slot; and
transmitting, by the terminal, the feedback response information corresponding to the plurality of downlink semi-persistent scheduling resource on the at least one PUCCH resource,
wherein the plurality of downlink semi-persistent scheduling resources are divided into one or more groups, the configuration information is used for indicating the downlink semi-persistent scheduling resources included in each group of downlink semi-persistent scheduling resources and the corresponding PUCCH resource, the corresponding PUCCH resource is used for feedback response information transmission of the each group of downlink semi-persistent scheduling resources, and each group of downlink semi-persistent scheduling resources includes at least two downlink semi-persistent scheduling resource, at least two downlink semi-persistent scheduling resources in one group of the one or more groups are in different slots, and the feedback response information corresponding to the downlink semi-persistent scheduling resources in different slots in the one group of the one or more groups are transmitted in one PUCCH resource of the at least one PUCCH resource.

2. The method according to claim 1, wherein the configuration information is used for indicating a slot or sub-slot for the PUCCH resource.

3. The method according to claim 2, wherein the configuration information is used for indicating the slot or sub-slot for the PUCCH resource, comprising that the configuration information is used for indicating index number information of the slot or sub-slot for the PUCCH resource.

4. The method according to claim 2, wherein the configuration information is used for indicating the slot or sub-slot for the PUCCH resource, comprising that the configuration information is used for indicating a time domain interval between the PUCCH resource and the corresponding downlink semi-persistent scheduling resources.

5. A method for resource configuration in New Radio (NR), comprising:
transmitting, by a network device, configuration information to one terminal, the configuration information being used for indicating at least one PUCCH resource, wherein the at least one PUCCH resource is used for transmitting feedback response information corresponding to a plurality of downlink semi-persistent scheduling resources configured for the one terminal, and the at least one PUCCH resource comprises a plurality of PUCCH resources in one slot; and
receiving, by the network device, the feedback response information corresponding to the plurality of downlink semi-persistent scheduling resource on the at least one PUCCH resource,
wherein the plurality of downlink semi-persistent scheduling resources are divided into one or more groups, the configuration information is used for indicating the downlink semi-persistent scheduling resources included in each group of downlink semi-persistent scheduling resources and the corresponding PUCCH resource, the corresponding PUCCH resource is used for feedback response information transmission of the each group of downlink semi-persistent scheduling resources, and each group of downlink semi-persistent scheduling resources includes at least two downlink semi-persistent scheduling resource, at least two downlink semi-persistent scheduling resources in one group of the one or more groups are in different slots, and the feedback response information corresponding to the downlink semi-persistent scheduling resources in different slots in the one group of the one or more groups are received in one PUCCH resource of the at least one PUCCH resource.

6. The method according to claim 5, wherein the configuration information is used for indicating a slot or sub-slot for the PUCCH resource.

7. The method according to claim 6, wherein the configuration information is used for indicating the slot or sub-slot for the PUCCH resource, comprising that the configuration information is used for indicating index number information of the slot or sub-slot for the PUCCH resource.

8. The method according to claim 6, wherein the configuration information is used for indicating the slot or sub-slot for the PUCCH resource, comprising that the configuration information is used for indicating a time domain interval between the PUCCH resource and the corresponding downlink semi-persistent scheduling resources.

9. A resource configuration device in New Radio (NR), comprising:

a processor; and a memory for storing a computer program, wherein the processor is configured to invoke and run the computer program stored in the memory to cause the resource configuration device to:

receive configuration information transmitted by a network device, the configuration information being used for indicating at least one physical uplink control channel PUCCH resource, wherein the at least one PUCCH resource is used for transmitting feedback response information corresponding to a plurality of downlink semi-persistent scheduling resources configured for one terminal, and the at least one PUCCH resource comprises a plurality of PUCCH resources in one slot; and transmit the feedback response information corresponding to the plurality of downlink semi-persistent scheduling resource on the at least one PUCCH resource, wherein the plurality of downlink semi-persistent scheduling resources are divided into one or more groups, the configuration information is used for indicating the downlink semi-persistent scheduling resources included in each group of downlink semi-persistent scheduling resources and the corresponding PUCCH resource, the corresponding PUCCH resource is used for feedback response information transmission of the each group of downlink semi-persistent scheduling resources, and each group of downlink semi-persistent scheduling resources includes at least two downlink semi-persistent scheduling resource, at least two downlink semi-persistent scheduling resources in one group of the one or more groups are in different slots, and the feedback response information corresponding to the downlink semi-persistent scheduling resources in different slots in the one group of the one or more groups are transmitted in one PUCCH resource of the at least one PUCCH resource.

* * * * *